Patent Cover Page

United States Patent [19]
Zech

[11] 3,886,293
[45] May 27, 1975

[54] FOOD PRODUCTS CONTAINING SURFACTANTS

[75] Inventor: John D. Zech, Wilmington, Del.

[73] Assignee: ICI United States Inc., Wilmington, Del.

[22] Filed: Feb. 8, 1974

[21] Appl. No.: 440,939

Related U.S. Application Data

[62] Division of Ser. No. 130,465, April 1, 1971, Pat. No. 3,846,479.

[52] U.S. Cl. .............. 426/553; 426/565; 426/659; 426/653
[51] Int. Cl............................................. A21d 13/08
[58] Field of Search ........... 426/152, 154, 155, 162, 426/163, 164, 226

[56] References Cited
UNITED STATES PATENTS

| | | | |
|---|---|---|---|
| 3,144,341 | 8/1964 | Thompson | 426/163 X |
| 3,228,772 | 1/1966 | Buddemeyer et al. | 426/164 X |
| 3,360,375 | 12/1967 | Buddemeyer et al. | 426/152 X |
| 3,495,990 | 2/1970 | Kayser | 426/163 |

*Primary Examiner*—Raymond N. Jones

[57] ABSTRACT

Surfactants are provided which are useful in a variety of food products. The surfactants are selected from the group consisting of (1) monoesters of succinic acid or adipic acid and an ester of lactic acid and a fatty alcohol, (2) esters of lactic acid and a half ester of succinic acid or adipic acid and a fatty alcohol, (3) ester products prepared by subjecting a mixture of lactic acid, succinic acid or lactic acid, and a fatty alcohol to esterification conditions, and (4) calcium, sodium, and potassium salts of monoester (1), ester (2), and ester product (3).

13 Claims, No Drawings

FOOD PRODUCTS CONTAINING SURFACTANTS

This is a division of application Ser. No. 130,465, filed Apr. 1, 1971, now U.S. Pat. No. 3,846,479.

This invention relates to a novel class of anionic surfactants. More particularly, this invention relates to surfactants which are especially useful in the preparation of food products. This invention further relates to improved food products containing a surfactant of this invention.

The properties of many food products, or example, volume, texture, and eating properties, are dependant upon the interaction of various ingredients during the preparation thereof and on the stabilization during subsequent baking, handling, and storage of the food products. It is known that the emulsion characteristics of food products may be improved by incorporating therein small amounts of various edible additives which are able to effect the colloidal properties of the proteinaceous, amylaceous, or oleginous food constituents. Generally, previously known materials which have been found to be useful surfactants in foods have not provided improvement in a sufficient variety of different foods. Surfactants which were highly effective in chemically leavened baked goods would not be completely acceptable in edible lipid-protein foam compositions; and, conversely, surfactants which were highly useful in edible lipid-protein foam compositions would not be very effective in chemically leavened baked goods.

Accordingly, it is an object of the present invention to provide surfactants which will improve the qualities of a wide variety of edible food products to which they are added.

It is another object of this invention to provide a novel class of anionic surfactants.

It is an object of the present invention to provide improved edible food products.

It is an object of the present invention to provide improved means for the preparation of chemically leavened baked foods.

It is another object of this invention to provide improved means for the preparation of edible lipid-protein foam compositions.

The foregoing objects and further objects and advantages of the present invention are achieved by providing surfactants which are suitable for use in the preparation of edible food products and which are prepared from succinic acid or adipic acid, lactic acid, and a fatty alcohol. More specifically, the surfactants of the present invention are selected from the group consisting of (1) a monoester of succinic acid or adipic acid and an ester of a lactic acid and a fatty alcohol, (2) an ester of a lactic acid and a monoester of succinic acid or adipic acid and a fatty alcohol, (3) an ester composition obtained by subjecting a mixture of succinic acid or anhydride or adipic acid, lactic acid, and a fatty alcohol to esterification reaction conditions, and (4) sodium, calcium and potassium salts of (1), (2), and (3).

The fatty alcohols which may be employed to prepare the surfactants of the present invention include the straight chain fatty alcohols containing from 10 to 22 carbon atoms. These fatty alcohols may be characterized by the generalized formula ROH wherein R is an alkyl group or an alkenyl group containing from 10 to 22 carbon atoms. Illustrative examples of such fatty alcohols include dodecanol, dodecenol, tetradecanol, tetradecenol, hexadecanol, hexadecenol, octadecanol, octadecenol (oleyl alcohol), eicosanol, eicosenol, docosanol, docosenol, tetracosanol, tetracosenol, hexacosanol, hexacosenol, octacosanol, and octacosenol.

The surfactants of the present invention may be prepared by reacting succinic acid or anhydride or adipic acid, fatty alcohol, and lactic acid in a mol ratio of about one mol of fatty alcohol per mol of succinic acid or anhydride or adipic acid and from about one to about four mols of lactic acid per mol of fatty alcohol and preferably about 2 mols of lactic acid per mol of fatty alcohol. The three reactants may be reacted, in any order or simultaneously, under esterification conditions which are conventional in the art. The reaction products contain at least two ester groups and an acid group. Salts of these ester products may be prepared by neutralizing the acid group with sodium hydroxide, calcium hydroxide, or potassium hydroxide.

Surfactant (1), a monoester of succinic acid or adipic acid and an ester of a lactic acid and a fatty alcohol, may be prepared by reacting succinic acid or adipic acid with an ester of lactic acid and a fatty alcohol. The ester of fatty alcohol and lactic acid may be prepared by reacting n mols of lactic acid with one mol of a fatty alcohol to form an intermediate product of the formula

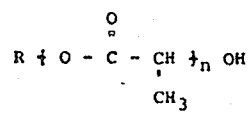

with the loss of n mols of water of esterification. For this purpose, aqueous lactic acid such as 85 percent lactic acid may be used; in which case, the water initially present in addition to the water of esterification is removed. This reaction may be carried out by heating a mixture of the lactic acid and fatty alcohol to a temperature from about 100° to about 250°C. until the required amount of aqueous distillate has been collected. The use of an inert gas to facilitate removal of the water is advantageous. Likewise, the use of vacuum near the end of the reaction is particularly advantageous for removal of all of the water of esterification and any volatile by-products which may be formed, such as the cyclic diester of a lactic acid. The volatile by-products of the reaction contribute to an off taste if left in the reaction product. The ester of lactic acid and fatty alcohol is then reacted with an equivalent amount of succinic anhydride, succinic acid, or adipic acid to form the half ester. This reaction is carried out by heating the succinic acid or anhydride or adipic acid with the ester of lactic acid and fatty alcohol to a temperature of 100° to 250°C. under a blanket of inert gas to prevent exposure to oxygen and thereby minimize color formation. A salt of the resulting half ester product may be prepared by partially or completely neutralizing the product to the desired acid number with an appropriate base, such as calcium hydroxide, sodium hydroxide or potassium hydroxide. The monoester of succinic acid or adipic acid and an ester of a lactic acid and a fatty alcohol and the sodium, calcium and potassium salts thereof may be characterized by the generalized formula

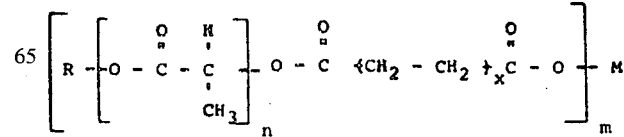

wherein R is an alkyl or alkenyl group containing from 10 to 22 carbon atoms, $n$ is an integer from 1 to 4, $x$ is 1 or 2, M is H, Ca, K, or Na, $m$ is 1 when M is H, K, or Na, and $m$ is 2 when M is Ca. Illustrative examples of compounds characterized by this formula are mono(stearyl lactate) succinate, mono(oleyl lactate) succinate, mono(stearyl lactyl lactate) succinate, mono(oleyl lactyl lactate) succinate, mono(stearyl lactate) adipate, mono(oleyl lactate) adipate, mono(stearyl lactyl lactate) adipate, mono(oleyl lactyl lactate) adipate and calcium, sodium, and potassium salts thereof.

Surfactant (2), an ester of a lactic acid and a monoester of succinic acid or adipic acid and a fatty alcohol, may be prepared in a manner similar to the preparation of surfactant (1) except that the fatty alcohol is first reacted with succinic acid or anhydride or adipic acid to form the half ester which is then reacted with lactic acid to form surfactant (2). The reaction of the succinic acid or anhydride or adipic acid with the fatty alcohol may be carried out under esterification conditions conventional in the art. For example, a mixture of equimolar amounts of succinic acid or anhydride or adipic acid and a fatty alcohol may be heated to a temperature of 100° to 250°C. to form the monoester. This esterification reaction may be carried out under a blanket of inert gas to prevent exposure to oxygen and thereby minimize color formation. The monester product is then reacted with $n$ mols of lactic acid at a temperature from about 100° to about 250°C. with the loss of $n$ mols of water of esterification. The lactic acid used for this purpose may be an aqueous solution containing 85 percent by weight of lactic acid. The water of esterification and any water initially present in the reaction mixture is removed. The resulting product, surfactant (2), contains a free acid group and at least one ester group. The acid group may be partially or completely neutralized with sodium or potassium hydroxide or calcium hydroxide to form the corresponding salt. The ester of lactic acid and a monoester of succinic acid or adipic acid and a fatty alcohol, surfactant (2), and the calcium, sodium, and potassium salts thereof may be characterized by the generalized formula

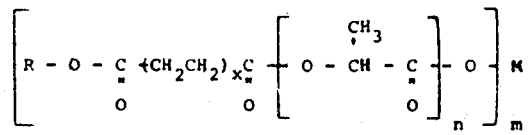

wherein R is an alkyl or alkenyl group containing from 10 to 20 carbon atoms, $n$ is an integer from 1 to 4, $x$ is 1 or 2, M is H, Ca, K, or Na, $m$ is 1 when M is H, Na, or K, and $m$ is 2 when M is Ca. Compounds characterized by this formula include monooleylmonolactyl succinate, monostearyl-monolactyl succinate, monododecyl-monolactyl succinate, mono(stearyl)-mono(lactyl lactate) succinate, mono(oleyl)-mono(lactyl lactate) succinate, monooleylmonolactyl adipate, monostearyl-monolactyl adipate, monododecylmonolactyl adipate, mono(stearyl)-mono(lactyl lactate) adipate, mono(oleyl)-mono(lactyl lactate) adipate, and calcium, sodium, and potassium salts thereof.

Surfactant (3), the ester composition obtained by subjecting a mixture of succinic acid or anhydride or adipic acid, lactic acid, and a fatty alcohol to esterification reaction conditions, is a complex mixture of esters having a completely random structure and comprises surfactant (1) and surfactant (2). The exact composition of surfactant (3) is not known. However, this surfactant composition may be readily prepared by subjecting a mixture of the three reactants to esterification conditions conventional in the art. The particular esterification conditions employed are not critical and form no part of this invention In general, however, the reaction is carried out at temperatures from about 100° to about 250°C. and the water of reaction is removed as it is formed. The amounts of fatty alcohol, succinic acid or anhydride or adipic acid, and lactic acid employed is such that the molar ratio of fatty alcohol to succinic acid anhydride or adipic acid is about 1 and the molar ratio of lactic acid to fatty alcohol is from about 1 to about 4 and preferably about 2.

In order that those skilled in the art may better understand the nature of the surfactant compositions of this invention and how they may be prepared, the following examples are given. These examples are set forth solely for the purpose of illustration and any specific enumeration of details contained therein should not be interpreted as expressing limitations of this invention. All parts and percentages are by weight, unless otherwise stated.

EXAMPLE 1

One mol of oleyl alcohol and 1 mol of succinic anhydride are placed in a three-necked flask equipped with thermometer, mechanical stirrer, and condenser. The reaction mixture is heated at 160°C. for 3 hours. The resulting monooleyl succinate product has the following analysis: saponification number 307, acid number 153. One mol of this monooleyl succinate is reacted with 1 mol of lactic acid (85 percent) for 3 hours at 175°–180°C. with stirring. The resulting monooleylmonolactyl succinate has the following analysis: acid number 127.5, saponification number 380.5, and hydroxyl number 20.5.

EXAMPLE 2

1,080 grams of stearyl alcohol and 400 grams of succinic anhydride are placed into a three-necked flask equipped with a thermometer, condenser, and mechanical stirrer. The reaction mixture is melted and then stirred for 35 minutes at temperatures between 125°–145°C. The resulting monostearyl succinate has the following analysis: saponification number 301, acid number 152, and hydroxyl number 10. One mol of lactic acid (85 percent) was placed in a three-necked flask equipped with a thermometer, mechanical stirrer, and condenser. Vacuum is applied to remove most of the water of the lactic acid. During the removal of water, the lactic acid is heated up to about 50°C. One mol of the monostearyl succinate is then added and the reaction mixture is heated at 175° to 180°C. for 4 hours. The resulting monostearylmonolactyl succinate has the following analysis: acid number 125.5, saponification number 390, and hydroxyl number 13.

EXAMPLE 3

810 grams of stearyl alcohol, 634 grams of 85 percent lactic acid, and 321 grams of succinic anhydride are mixed together and added to the reaction flask described in Example 1. The contents of the flask are heated at 170°C. for 5½ hours under nitrogen atmosphere. The temperature is then raised to 225°C. and held for another 3 hours. The resulting ester product weighed 1,477 grams and has the following analysis: acid number 115, saponification number 407, and hydroxyl number 10.

EXAMPLE 4

40 grams of stearyl alcohol, 424 grams of 85 percent lactic acid and 264 grams of adipic acid are mixed together and added to the reaction flask described in Example 1. The contents are heated under a nitrogen atmosphere for 3 hours at 200°C. then for 2 hours at 225°C. The resulting ester weighed 1,049 grams and has the following analysis: acid number 102, saponification number 399, and hydroxyl number 15.

EXAMPLE 5

428 grams of myristyl alcohol, 424 grams of 85 percent lactic acid and 264 grams of adipic acid are mixed together and added to the reaction flask described in Example 1. The contents are heated under a nitrogen atmosphere for 3 hours at 200°C. and then for 2 hours at 225°C. The resulting ester weighed 848 grams and has the following analysis: acid number 114, saponification number 455, hydroxyl number 16.

EXAMPLE 6

One mol of the product of Example 5 is dissolved in acetone and neutralized with ½ mol of calcium hydroxide slurried in water.

EXAMPLE 7

Two mols of dodecanol and two mols of succinic anhydride are placed in a three-necked flask equipped with thermometer, mechanical stirrer, and condenser. The reaction mixture is heated at 159°C. for 3 hours. One mol of the resulting dodecyl succinate is reacted with 1 mol of lactic acid (85 percent) at 170°C. for 3 hours to form monododecyl-monolactyl succinate.

EXAMPLE 8

810 grams of stearyl alcohol and 634 grams of 85 percent lactic acid are reacted at 155°–173°C. for 7.5 hours. The resulting product has an acid number of 6.4, saponification number of 268 and a hydroxyl number of 132. 561 grams of this ester product is then reacted with 125 grams of succinic anhydride at 122°–150°C. for 6 hours to form the monosuccinate ester product having the following analysis: acid number 111, saponification number 425, and hydroxyl number 17.

EXAMPLE 9

209 grams of the product of Example 8 is dissolved in 100 ml of acetone and neutralized by the addition of 16.6 grams of sodium hydroxide dissolved in 26 ml of water. After stripping off the solvent under vacuum, the product has the following analysis: acid number 17.4, saponification 265, percent water 5.3.

EXAMPLE 10

Two mols of stearyl alcohol and 2 mols of lactic acid (85 percent) are placed into a three-necked flask equipped with thermometer, mechanical stirrer, and condenser. The reaction mixture is heated at 160°C. for 3 hours. The resulting stearyl lactate product has the following analysis: saponification number 164, hydroxyl number 165, and acid number 4.5. One mol of the stearyl lactate is then reacted with 1 mol of succinic acid for 3 hours at 175°–180°C. with stirring. The resulting mono(stearyl lactate) succinate has the following analysis: acid number 121, saponification number 365 and hydroxyl number 12. The free acid group of the mono(stearyl lactate) succinate is the neutralized with calcium hydroxide to form the salt.

EXAMPLE 11

352 grams of mono(stearyl lactyl lactate) succinate made according to the procedure of Example 8 and having the following analysis: acid number 16.5, saponification number 426.5, and hydroxyl number 12, is dissolved in 300 cc. of acetone and neutralized with a solution of 29.1 grams of sodium hydroxide dissolved in 29.1 ml of water. After air drying, the product has the following analysis: acid number 26.6, saponification number 183, percent water 11.7.

EXAMPLE 12

One mol of an alkyl alcohol containing 22 carbon atoms, 1 mol of lactic acid, and 1 mol of succinic anhydride are reacted at 170°C. for 6 hours under a nitrogen blanket. The temperature is then raised to 200°C. and held for another 3 hours to form an ester product.

EXAMPLE 13

A mixture of 1047 grams of oleyl alcohol and 85 grams of 85 percent lactic acid are heated for 2.5 hours at 120°C., for 10.25 hours at 150°–170°C. and finally for an additional 4.25 hours at 200°–218°C. to yield a product having an acid number of 2.5, saponification number 273, and hydroxyl number 140. One thousand grams of this reaction product is reacted with 248 grams of succinic anhydride for 4 hours at 130°–140°C. The resulting monosuccinate ester has an acid number of 111, saponification number 439, and a hydoxyl number of 6.

EXAMPLE 14

255 grams of the ester product of Example 13 is dissolved in 40 ml of acetone and neutralized with 29 grams of sodium hydroxide dissolved in 35 ml of water. The resulting sodium salt analysizes as follows: acid number 7.8, saponification number 263, and percent water 2.3.

EXAMPLE 15

810 grams of stearyl alcohol and 634 grams of lactic acid (85 percent) is reacted for 13.5 hours at 170°C. under a nitrogen blanket to yield 1,220 grams of an ester product having an acid number of 6.6, saponification number of 268 and a hydroxyl number of 131. 561 grams of this ester product and 125 grams of succinic anhydride are mixed together and heated under a nitrogen blanket at 150°C. for 3 hours to form a monoester of succinic acid having the following analysis: acid number 109, saponification number 419, and hydroxyl number 25.

EXAMPLE 16

One mol of the product of Example 1 is dissolved in acetone and neutralized by the addition of 1 mol of potassium hydroxide dissolved in water.

EXAMPLE 17

The product of Example 3 is dissolved in acetone and neutralized with an equal molar amount of potassium hydroxide dissolved in water.

EXAMPLE 18

The product of Example 5 is dissolved in acetone and neutralized with an equal molar amount of sodium hydroxide dissolved in water.

The surfactants of the present invention are useful in the preparation of food products. The surfactants may be used to improve any food product wherein a surface active agent is normally employed. Illustrative examples of such food products include cakes, pies, doughnuts, bread, icings, fillings, whipped toppings, and frozen confections including ice cream, mellorine, ice milk, sherbets, and frozen deserts. The emulsifying agents of this invention may be incorporated into the food product by any means normally used in the art. Such means may include the addition of the surfactant to one or more ingredient of the food product or to the final food product. The amount of surfactant used will depend on the particular surfactant used and on the nature of the food product in which it is used. The amount of surfactant generally used, however, is from about 0.001 to about 15 percent by weight, based on the total weight of the food product.

The surfactants of this invention are particularly useful in the preparation of chemically leavened baked products. The surfactants may be incorporated into the baked products by direct addition to the batter, dough, or other shortening-containing emulsion, or by admixture with a dry ingredient in the form of a premix for said emulsion. In the practice of this invention it has been found that especially desirable results are obtained in many instances by incorporating the surfactant into the chemically leavened baked products by mixing the surfactant of this invention with a oleaginous substance, either by co-melting or by votating it in, or by adding the surfactant to the batter in the form of a water dispersion.

Oleaginous substances which may be employed in the practice of this invention for admixture with the surfactants are plastic, semi-fluid, or liquid glyceride shortenings derived from animal, vegetable, or marine fats and oils. These glycerides may have saturated or unsaturated long-chain fatty acid groups containing from about 12 to about 22 carbon atoms, such as, lauroyl, lauroleoyl, myristoyl, myristoleoyl, palmitoyl, palmitoleoyl, stearoyl, oleoyl, linoleoyl, linolenoyl, arachidoyl, and behenoyl. The glycerides are generally obtained from edible fats and oils such as cottonseed oil, soybean oil, coconut oil, rapeseed oil, peanut oil, olive oil, sunflower seed oil, corn oil, sesame seed oil, safflower oil, whale oil, fish oil, lard and tallow. The glycerides can also contain one or two short-chain saturated fatty acid group having from 2 to about 6 carbon atoms such as acetyl, propanoyl, butanoyl, valeroyl, and caproyl. They can be prepared by random or low temperature interesterification reactions of fatty triglyceride-containing oils and fats such as cottonseed oil and lard. The shortenings usually contain from about 0.5 to about 10 percent by weight of surfactant based on the weight of shortening.

The surfactant of the present invention may also be used as dry ingredients of a prepared cake mix in combination with other materials such as flour and sugar; or, if preferred, the surfactants may be added in dry form directly to the cake batter or other bakery emulsion.

The surfactants of this invention have been found to substantially improve the texture, volume, symmetry, tenderness, and mouth-feel of food products and to bring the fats and other ingredients into more intimate contact with each other and thereby aid in efficiency of mixing of the batter and aid in batter aeration.

The surfactants of the present invention may also be used as emulsification agents in the preparation of whipped toppings and frozen confections including ice cream, mellorine, ice milk, sherbets, and frozen deserts, hereinafter collectively referred to as lipid-protein foam compositions. Formulations and means for formulating lipid-protein foam compositions conventionally used in the art may be employed in the preparation of the lipid-protein foam compositions of the present invention. The precise formulation of the lipid-protein foam composition and the exact method employed for the incorporation of the surfactants of this invention into said foam composition forms no part of the present invention. The amount of surfactant employed will depend mainly on the nature of the particular lipid-foam composition. For example, frozen confections preferably contain from about 0.1 to about 1 percent, by weight, of surfactant whereas whipped toppings preferably contain from about 0.5 to about 1.5 percent, by weight, of surfactant.

Lipids useful in the preparation of the lipid-protein foam compositions of this invention comprise fats and oils of both animal and vegetable origin. These, of course, include natural triglycerides of long chain fatty acids such as stearic acid, palmitic acid, lauric acid, oleic acid, margaric acid, myristic acid, and any other long chain fatty acids. Blends of natural fats and oils may desirably be used.

Proteinaceous material useful in the formation of lipid-protein foam composition in accordance with this invention comprise any proteinaceous material which is normally used in the food art and including sodium and calcium caseinates, milk solids, non-fat milk solids, silica protein derivatives, partially hydrolyzed fish protein, whey solids, gelatin, egg albumen, and equivalent proteinaceous materials.

The food products of the present invention may also contain additional surfactants, sweeteners, flavors, and other ingredients generally used in the preparation of food products.

In order that those skilled in the art may better understand how the present invention may be practiced, the following examples are given. These examples are set forth solely for the purpose of illustration and any specific enumeration of details contained therein should not be interpreted as expressing limitations with this invention. All parts and percentages are by weight unless otherwise stated.

The following are specific examples of ice cream confections prepared according to the method of this invention. The principal dry ingredients, sugar, milk powder, and surfactant are added together with a selected stabilizer to the liquid ingredients comprising cream and water. The resulting mixture of the ingredients is homogenized at 2,500 total p.s.i.g., pasturized at 160°F. for 20 minutes, the temperature of the mixture lowered to 40°F. and, after being held at that temperature for a period of time, frozen at between 20° and 25°F.

EXAMPLE 19

| Ingredient | Percent by Weight |
| --- | --- |
| Butter Fat | 12.0 |
| Serum Solids | 11.0 |
| Sucrose | 15.0 |
| Carboxymethyl Cellulose | 0.2 |
| Mono(Stearyl lactyl lactate) succinate | 0.1 |
| H₂O | 61.7 |

EXAMPLE 20

| Ingredient | |
| --- | --- |
| Butter Fat | 12.0 |
| Serum Solids | 11.0 |
| Sucrose | 15.0 |
| Carboxymethyl Cellulose | 0.2 |
| Sodium salt of mono(oleyl lactyl lactate) succinate | 0.1 |
| H₂O | 61.7 |

EXAMPLE 21

| Ingredient | |
| --- | --- |
| Butter Fat | 12.0 |
| Serum Solids | 11.0 |
| Sucrose | 15.0 |
| Stabilizer | 0.2 |
| Sodium Salt of mono(stearyl lactyl lactate) succinate | 0.1 |
| H₂O | 61.7 |

EXAMPLE 22

| Ingredient | |
| --- | --- |
| Butter Fat | 12.0 |
| Serum Solids | 11.0 |
| Sucrose | 15.0 |
| Stabilizer | 0.2 |
| Calcium salt of mono(oleyl lactyl lactate) succinate | 0.1 |
| Monoglyceride | 0.4 |
| H₂O | 61.3 |

EXAMPLE 23

| Ingredient | |
| --- | --- |
| Butter Fat | 4.0 |
| Serum Solids | 10.0 |
| Sucrose | 13.0 |
| Carboxymethyl Cellulose | 0.05 |
| Mono(laryl lactate) succinate | 0.01 |
| H₂O | 72.94 |

EXAMPLE 24

| Ingredient | |
| --- | --- |
| Butter Fat | 14.0 |
| Serum Solids | 17.0 |
| Sucrose | 18.0 |
| Carboxymethyl Cellulose | 0.30 |
| Monobehenyl monolactyl succinate | 1.0 |
| H₂O | 49.7 |

EXAMPLE 25

| Ingredient | |
| --- | --- |
| Butter Fat | 9.0 |
| Serum Solids | 13.0 |
| Sucrose | 15.5 |
| Carboxymethyl Cellulose | .17 |
| Potassium salt of mono(stearyl)-mono(lactyl lactate) succinate | 0.50 |
| H₂O | 61.83 |

EXAMPLE 26

| Ingredient | |
| --- | --- |
| Butter Fat | 12.0 |
| Serum Solids | 11.0 |
| Sucrose | 15.0 |
| Carboxymethyl Cellulose | 0.2 |
| Product of Example 6 | 0.1 |
| H₂O | 61.7 |

The following are specific examples of the preparation of whipped toppings of this invention. All of the dry ingredients listed are weighed into a large stainless steel beaker and mixed thoroughly. Thereafter the resulting dry mix is added to the water and again mixed thoroughly. To the resulting wet mix is then added the remaining ingredients comprising fat and emulsifier blend. (The fat may be liquified by melting, if necessary). The mixture is pasteurized at 145°F. for 25 minutes and homogenized at 1,000 p.s.i. on the first stage and at 500 p.s.i. on the second stage of a Manton-Gaulin two-stage laboratory homogenizer. The resulting emulsion is immediately cooled to 38°–40°F. using a surface cooler and is then allowed to age overnight at 38°–40°F. 600 grams of the aged mix are placed into a 8 quart bowl of a C-100 Hobart mixer and whipped at moderate speed using a wire whip to form an aerated topping exhibiting improved air-cell structure, emulsion stability, dryness and texture.

EXAMPLE 27

| Ingredient | Percent by Weight |
|---|---|
| Fat | 30.0 |
| Sucrose | 6.0 |
| Sodium Caseinate | 3.0 |
| Corn Syrup | 2.0 |
| Carboxymethyl Cellulose | 0.5 |
| Sodium Carboxymethyl Cellulose | 0.05 |
| Mono(oleyl lactyl lactate) succinate | 0.08 |
| $H_2O$ | q.s. to 100 |

EXAMPLE 28

| Ingredient | |
|---|---|
| Fat | 30.0 |
| Sucrose | 6.0 |
| Sodium Caseinate | 3.0 |
| Corn Syrup | 2.0 |
| Carboxymethyl Cellulose | 0.5 |
| Sodium Carboxymethyl Cellulose | 0.05 |
| Ester product of Example 4 | 0.08 |
| $H_2O$ | q.s. to 100 |

EXAMPLE 29

| Ingredient | |
|---|---|
| Fat (vegetable fat, M.P. 96°F.) | 32 |
| Protein (sodium caseinate) | 6 |
| Sucrose | 7 |
| Hydroxypropyl Cellulose | 1 |
| Mono(oleyl lactyl lactate) succinate | 0.4 |
| Water | q.s. to 100 |

EXAMPLE 30

| Ingredient | |
|---|---|
| Fat (vegetable fat, M.P. 96°F.) | 18 |
| Protein (sodium caseinate) | 8 |
| Sucrose | 8 |
| Hydroxypropyl Cellulose | 0.5 |
| Mono(oleyl lactyl lactate) succinate | 0.25 |
| Monoglyceride (glyceryl monostearate) | 1 |
| Water | q.s. to 100 |

EXAMPLE 31

| Ingredient | |
|---|---|
| Fat (animal fat, M.P. 96°F.) | 25 |
| Protein (milk solids) | 8 |
| Hydroxypropyl Cellulose | 4 |
| Sorbitan monostearate | 0.3 |
| Mono(stearyl lactyl lactate) succinate | 0.8 |
| Monoglyceride (glyceryl monooleate) | 0.2 |
| Water | q.s. to 100 |

EXAMPLE 32

| Ingredient | |
|---|---|
| Fat (vegetable fat, M.P. 96°F.) | 30 |
| Sucrose | 5 |
| Hydroxypropyl Cellulose | 3 |
| Monoglyceride (glyceryl monostearate) | 0.1 |
| Sodium salt of mono(stearyl lactyl lactate) succinate | 0.1 |
| Water | q.s. to 100 |

EXAMPLE 33

| Ingredient | |
|---|---|
| Fat (animal, M.P. 96°F.) | 28 |
| Protein (egg albumen) | 5 |
| Sucrose | 3 |
| Hydroxypropyl Cellulose | 2 |
| Mono(stearyl lactate) succinate | 0.4 |
| Water | q.s. to 100 |

EXAMPLE 34

| Ingredient | |
|---|---|
| Fat (vegetable fat, M.P. 96°F.) | 23 |
| Protein (calcium caseinate) | 7 |
| Sucrose | 6 |
| Hydroxypropyl cellulose | 1.5 |
| Monostearyl-monolactyl succinate | 1 |
| Water | q.s. to 100 |

EXAMPLE 35

| Ingredient | |
|---|---|
| Fat (vegetable fat, M.P. 96°F.) | 36 |
| Protein (sodium caseinate) | 4 |
| Sucrose | 4 |
| Hydroxypropyl Cellulose | 2.5 |
| Sodium salt of mono(stearyl-mono(lactyl lactate) succinate | 0.1 |
| Sodium salt of mono(stearyl lactate) succinate | 0.2 |
| Water | q.s. to 100 |

The following are illustrative examples of the preparation of chemically leavened baked products. The filled shortening and the other liquid ingredients are added simultaneously to all of the dry mix ingredients and mixed with an electric mixer at 500 rpm for a total of 4 minutes. The resulting batter is placed in an 8-inch pan and baked in an oven at 365°F. for about 25 minutes. The cakes are fine-grained in texture, have high volume, have improved symmetry, and have excellent eating qualities. Similar good results are obtained with cakes containing one or more of the other surfactans of this invention.

EXAMPLE 36

| Ingredient | Grams |
| --- | --- |
| Cake Flour | 200 |
| Sucrose | 260 |
| Non-fat Dry Milk Solids | 25 |
| Salt | 4 |
| Baking Powder | 10 |
| Shortening containing 3% by weight of mono(stearyl lactyl lactate) succinate | 80 |
| Water | 170 |
| Egg Yolks | 80 |
| Whole Eggs | 50 |

EXAMPLE 37

| Ingredient | Grams |
| --- | --- |
| Cake Flour | 400 |
| Sucrose | 520 |
| Non-fat Dry Milk Solids | 50 |
| Salt | 8 |
| Baking Powder | 20 |
| Shortening containing 6% by weight of mono(stearyl lactyl lactate) succinate | 160 |
| Water | 340 |
| Egg Yolks | 160 |
| Whole Eggs | 100 |

EXAMPLE 38

| Ingredient | Grams |
| --- | --- |
| Cake Flour | 150 |
| Sucrose | 195 |
| Non-fat Dry Milk Solids | 18 |
| Salt | 3 |
| Baking Powder | 8 |
| Shortening containing 3% by weight of sodium salt of mono(stearyl lactyl lactate) succinate | 60 |
| Water | 127 |
| Egg Yolks | 60 |
| Whole Eggs | 38 |

EXAMPLE 39

| Ingredient | Grams |
| --- | --- |
| Cake Flour | 100 |
| Sucrose | 130 |
| Non-fat Dry Milk Solids | 12 |
| Salt | 2 |
| Baking Powder | 5 |
| Shortening containing 6% by weight of sodium salt of mono(stearyl lactyl lactate) succinate | 40 |
| Water | 85 |
| Egg Yolks | 40 |
| Whole Eggs | 25 |

EXAMPLE 40

| Ingredient | Grams |
| --- | --- |
| Cake Flour | 107 |
| Granulated Sugar | 133 |
| Sodium Chloride | 2 |
| Double acting Baking Powder | 7 |
| Shortening containing 3% by weight of mono(stearyl lactate) succinate | 48 |
| Whole Milk | 130 |
| Egg Whites | 60 |

EXAMPLE 41

| Ingredient | Grams |
| --- | --- |
| Cake Flour | 200 |
| Sugar | 232 |
| Non-fat Milk Solids | 17 |
| Baking Powder | 10 |
| Salt | 6 |
| Shortening containing 6% by weight of monostearyl-monolactyl succinate | 73 |
| Whole Eggs | 100 |
| Water | 273 |

EXAMPLE 42

| Ingredient | Grams |
| --- | --- |
| Cake Flour | 360 |
| Salt | 10 |
| Baking Powder | 22 |
| Sugar | 435 |
| Powdered Milk | 36 |
| Dry Vanilla Concentrate | 1 |
| Shortening containing 6% by weight of sodium salt of mono(stearyl)-mono(lactyl lactate) succinate | 130 |
| Water | 325 |
| Egg Whites | 250 |

EXAMPLE 43

| Ingredient | Grams |
| --- | --- |
| Cake Flour | 200 |
| Sucrose | 260 |
| Non-fat Dry Milk Solids | 25 |
| Salt | 4 |
| Baking Powder | 10 |
| Shortening containing 3% by weight of Product of Example 5 | 80 |
| Water | 170 |
| Egg Yolks | 80 |
| Whole Eggs | 50 |

It will be understood that the foregoing examples are merely illustrative of the invention defined and claimed herein and the skilled artist will be able to formulate many other examples which come within the scope of this invention after reading the specification and appended claims.

What is claimed is new and desired to be protected by Letters Patent of the United States is:

1. A food product containing an effective amount of a surfactant composition selected from the group consisting of 1. an ester characterized by the formula

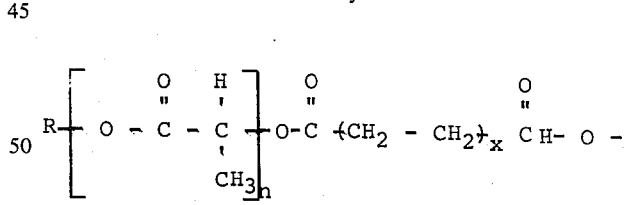

wherein R is an alkyl or alkenyl group containing from 10 to 22 carbon atoms, $n$ is an integer from 1 to 4, and $x$ is 1 or 2, 2. an ester characterized by the formula

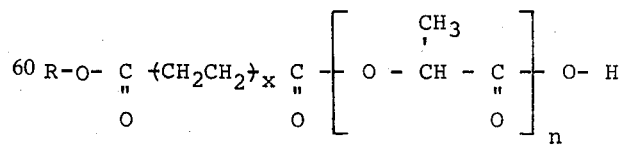

wherein R is an alkyl or alkenyl group containing from 10 to 20 carbon atoms, $n$ is an integer from 1 to 4, and $x$ is 1 or 2.

3. an ester composition obtained by subjecting a mixture of succinic acid or anhydride or adipic acid, a lactic acid having the formula

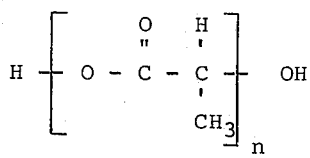

wherein $n$ is an integer from 1 to 4, and a fatty alcohol to esterification reaction conditions, and 4. a potassium, calcium, or sodium salt of (1), (2), or (3).

2. A food product of claim 1 which is a chemically leavened baked product containing shortening and containing from 0.5 to 10 percent by weight, based on the weight of shortening, of a composition selected from the group consisting of 1. an ester characterized by the formula

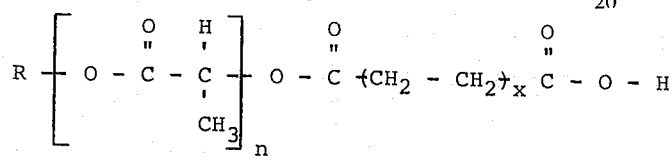

wherein R is an alkyl or alkenyl group containing from 10 to 22 carbon atoms, $n$ is an integer from 1 to 4, and $x$ is 1 or 2, 2. an ester characterized by the formula

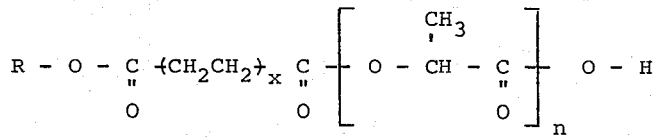

wherein R is an alkyl or alkenyl group containing from 10 to 20 carbon atoms, $n$ is an integer from 1 to 4, and $x$ is 1 or 2, 3. an ester composition obtained by subjecting a mixture of succinic acid or anhydride or adipic acid, a lactic acid having the formula

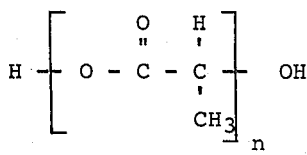

wherein $n$ is an integer from 1 to 4, and a fatty alcohol to esterification reaction conditions, and 4. a potassium, calcium, or sodium salt of (1), (2), or (3).

3. A food product of claim 1 which is a chemically leavened cake containing shortening and containing from 0.5 to 10 percent by weight, based on the weight of shortening, of a composition selected from the group consisting of 1. an ester characterized by the formula

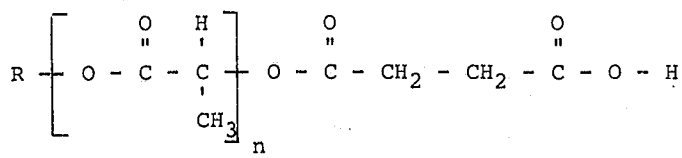

wherein R is an alkyl or alkenyl group containing from 10 to 22 carbon atoms, and $n$ is an integer from 1 to 4, 2. an ester characterized by the formula

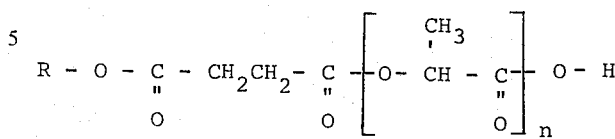

wherein R is an alkyl or alkenyl group containing from 10 to 20 carbon atoms, and $n$ is an integer from 1 to 4, 3. an ester composition obtained by subjecting a mixture of succinic acid or anhydride, a lactic acid having the formula

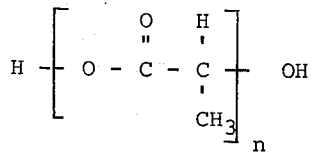

wherein $n$ is an integer from 1 to 4, and a fatty alcohol to esterification reaction conditions, and 4. a potassium, calcium, or sodium salt of (1), (2), or (3).

4. A food product of claim 1 which is a lipid-protein foam composition containing from 0.01 to 3 percent by weight of a composition selected from the group consisting of 1. an ester characterized by the formula

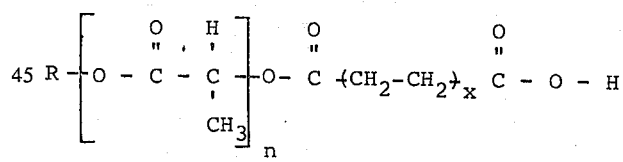

wherein R is an alkyl or alkenyl group containing from 10 to 22 carbon atoms, $n$ is an integer from 1 to 4, and $x$ is 1 or 2, 2. an ester characterized by the formula

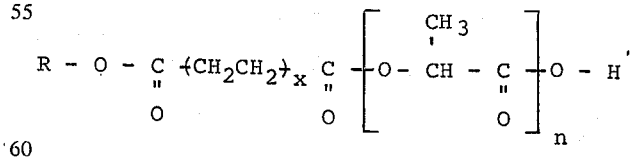

wherein R is an alkyl or alkenyl group containing from 10 to 20 carbon atoms, *n* is an integer from 1 to 4, and *x* is 1 or 2.

3. an ester composition obtained by subjecting a mixture of succinic acid or anhydride or adipic acid, a lactic acid having the formula

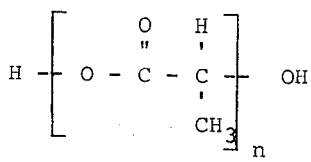

wherein *n* is an integer from 1 to 4, and a fatty alcohol to esterification reaction conditions, and 4. a potassium, calcium, or sodium salt of (1), (2), or (3).

5. A food product of claim 1 which is a frozen confectionary composition containing from 0.01 to 1 percent by weight of a composition selected from the group consisting of 1. an ester characterized by the formula

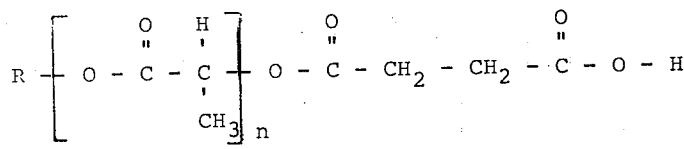

wherein R is an alkyl or alkenyl group containing from 10 to 22 carbon atoms, and *n* is an integer from 1 to 4, 2. an ester characterized by the formula

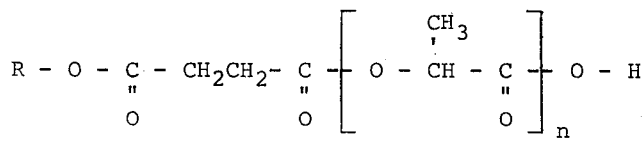

wherein R is an alkyl or alkenyl group containing from 10 to 20 carbon atoms, and *n* is an integer from 1 to 4, 3. an ester composition obtained by subjecting a mixture of succinic acid or anhydride, a lactic acid having the formula

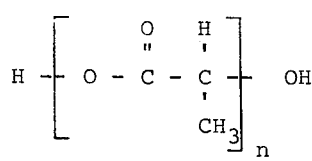

wherein *n* is an integer from 1 to 4, and a fatty alcohol to esterification reaction conditions, and 4. a potassium, calcium, or sodium salt of (1), (2), or (3).

6. A food product of claim 1 which is an edible whipped topping composition containing from 0.5 to 1.5 percent by weight of a composition which is selected from the group consisting of 1. an ester characterized by the formula

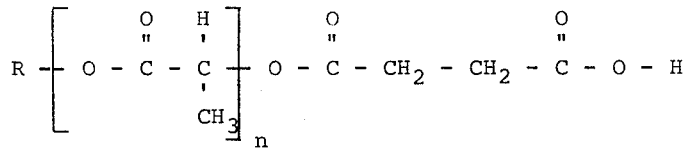

wherein R is an alkyl or alkenyl group containing from 10 to 22 carbon atoms, and *n* is an integer from 1 to 4, 2. an ester characterized by the formula

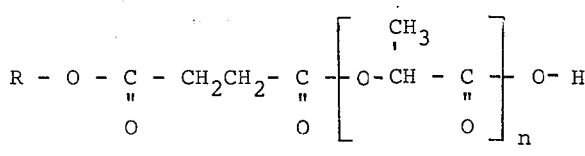

wherein R is an alkyl or alkenyl group containing from 10 to 20 carbon atoms, and *n* is an integer from 1 to 4, 3. an ester composition obtained by subjecting a mixture of succinic acid or anhydride, a lactic acid having the formula

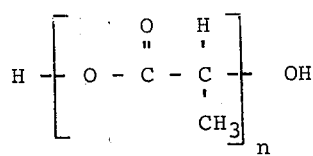

wherein *n* is an integer from 1 to 4, and a fatty alcohol to esterification reaction conditions, and 4. a potassium, calcium, or sodium salt of (1), (2), or (3).

7. A food product of claim 1 which contains an ester characterized by the formula

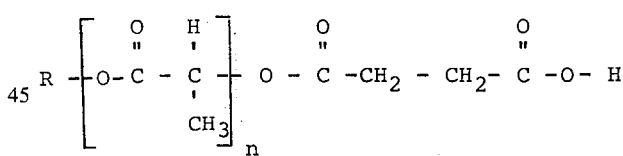

wherein R is an alkyl or alkenyl group containing from 10 to 22 carbon atoms, and *n* is an integer from 1 to 4.

8. A food product of claim 1 which contains an ester characterized by the formula

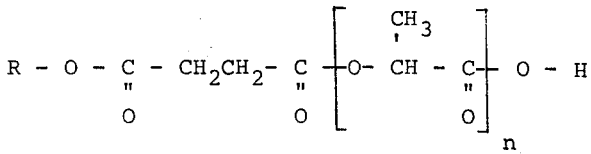

wherein R is an alkyl or alkenyl group containing from 10 to 20 carbon atoms, and *n* is an integer from 1 to 4.

9. A food product of claim 1 which contains a composition obtained by subjecting a mixture of succinic acid, a lactic acid having the formula

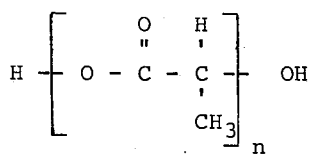

wherein *n* is an integer from 1 to 4, and a fatty alcohol to esterification reaction conditions.

10. A food product of claim 1 which contains a potassium, calcium, or sodium salt of ester (1), ester (2), or ester composition (3).

11. A food product of claim 1 which contains an ester composition obtained by subjecting a mixture of from about 1 mol of succinic acid or anhydride or adipic acid, about 1 mol of a fatty alcohol, and from about 1 to about 4 mols of lactic acid to esterification reaction conditions.

12. A food product of claim 1 which contains a composition selected from the group consisting of mono(stearyl lactyl lactate)adipate, sodium, calcium, and potassium salts of mono(stearyl lactyl lactate)adipate, mono(oleyl lactyl lactate) adipate, sodium, calcium, and potassium salts of mono(oleyl lactyl lactate) adipate, mono(stearyl lactate)adipate, mono(oleyl lactate)adipate, sodium, calcium, and potassium salts of mono(stearyl lactate) adipate, sodium, calcium, and potassium salts of mono(oleyl lactate)adipate, monostearyl-monolactyl adipate, sodium, calcium, and potassium salts of monostearyl-monolactyl adipate, monooleyl-monolactyl adipate, sodium, calcium, and potassium salts of monooleyl-monolactyl adipate, mono(stearyl)-mono(lactyl lactate)adipate, sodium, calcium, and potassium salts of mono(stearyl)-mono(lactyl lactate)adipate, mono(oleyl)-mono(lactyl lactate)adipate, sodium, calcium, and potassium salts of mono(oleyl)-mono(lactyl lactate)adipates, and mixtures thereof.

13. A food product of claim 1 which contains a composition selected from the group consisting of mono(stearyl lactyl lactate)succinate, sodium, calcium, and potassium salts of mono(stearyl lactyl lactate)succinate, mono(oleyl lactyl lactate) succinate, sodium, calcium, and potassium salts of mono(oleyl lactyl lactate)succinate, mono(stearyl lactate)succinate, mono(oleyl lactate)succinate, sodium, calcium, and potassium salts of mono(stearyl lactate) succinate, sodium, calcium, and potassium salts of mono(oleyl lactate)succinate, monostearyl-monolactyl succinate, sodium, calcium, and potassium salts of monostearyl-monolactyl succinate, monooleyl-monolactyl succinate, sodium, calcium, and potassium salts of monooleyl-monolactyl succinate, mono(stearyl)-mono(lactyl lactate)succinate, sodium, calcium, and potassium salts of mono(stearyl)-mono(lactyl lactate)succinate, monoo(oleyl)-mono(lactyl lactate)succinate, sodium, calcium, and potassium salts of mono(oleyl)-mono(lactyl lactate)succinates, and mixtures thereof.

* * * * *

UNITED STATES PATENT AND TRADEMARK OFFICE
CERTIFICATE OF CORRECTION

PATENT NO. : 3,886,293
DATED : May 27, 1975
INVENTOR(S) : John D. Zech

It is certified that error appears in the above—identified patent and that said Letters Patent are hereby corrected as shown below:

Column 3, line 28, "monester" should read -- monoester --.

Column 8, line 26, "0.1" should read -- 0.01 --.

Column 10, line 64, "8 quart" should read -- 3 quart --.

Column 14, line 49, last part of structure:

$$\overset{O}{\underset{\|}{C}} H - O -$$ should read -- $$\overset{O}{\underset{\|}{C}} - O - H$$ --.

Column 20, line 29, "monoo(oleyl)-mono(lactyl lactate)succinate" should read -- mono(oleyl)-mono(lactyl lactate)succinate --.

Signed and Sealed this

Tenth Day of May 1977

[SEAL]

Attest:

RUTH C. MASON
Attesting Officer

C. MARSHALL DANN
Commissioner of Patents and Trademarks